(12) United States Patent
Sehrschoen (10) Patent No.: US 11,279,029 B2
(45) Date of Patent: Mar. 22, 2022

(54) ARTICULATED-ARM ROBOT AND METHOD FOR MACHINING A WORKPIECE BY MEANS OF THE ARTICULATED-ARM ROBOT

(71) Applicant: Fill Gesellschaft m.b.H., Gurten (AT)

(72) Inventor: Harald Sehrschoen, Waldzell (AT)

(73) Assignee: Fill Gesellschaft m.b.H., Gurten (AT)

( * ) Notice: Subject to any disclaimer, the term of this patent is extended or adjusted under 35 U.S.C. 154(b) by 302 days.

(21) Appl. No.: 16/486,291

(22) PCT Filed: Feb. 27, 2018

(86) PCT No.: PCT/AT2018/060052
§ 371 (c)(1),
(2) Date: Aug. 15, 2019

(87) PCT Pub. No.: WO2018/157184
PCT Pub. Date: Sep. 7, 2018

(65) Prior Publication Data
US 2020/0230814 A1    Jul. 23, 2020

(30) Foreign Application Priority Data
Feb. 28, 2017   (AT) ................ A50158/2017

(51) Int. Cl.
*B25J 19/02* (2006.01)
*B25J 9/16* (2006.01)
(Continued)

(52) U.S. Cl.
CPC ........... *B25J 9/1638* (2013.01); *B25J 9/108* (2013.01); *B25J 9/1633* (2013.01); *B25J 9/1694* (2013.01);
(Continued)

(58) Field of Classification Search
CPC .. B24B 39/045; Y10T 483/171; B25J 13/088; B25J 9/047; B25J 11/0055; B25J 19/02;
(Continued)

(56) References Cited

U.S. PATENT DOCUMENTS

| | | | |
|---|---|---|---|
| 4,956,945 | A | 9/1990 | Ooshima |
| 5,397,212 | A | 3/1995 | Watanabe et al. |

(Continued)

FOREIGN PATENT DOCUMENTS

| | | | |
|---|---|---|---|
| EP | 0 333 352 A2 | 9/1989 | |
| EP | 0 985 989 A2 | 3/2000 | |

(Continued)

OTHER PUBLICATIONS

Albu-Schaffer et al., Soft robotics, 2008, IEEE, p. 20-30 (Year: 2008).*

(Continued)

*Primary Examiner* — McDieunel Marc
(74) *Attorney, Agent, or Firm* — Collard & Roe, P.C.

(57) ABSTRACT

An articulated-arm robot and a method for machining a workpiece by means of the articulated-arm robot includes a base; a working head holder; several lever arms, which are arranged between the base and the working head holder, the lever arms being coupled to one another by means of revolute joints; a working head which is arranged on the working head holder, the working head comprising a working spindle which is arranged in a spindle housing and is mounted in the spindle housing at least at a first bearing point and a second bearing point. At least one sensor for sensing a radial force is formed at each of the first bearing point and the second bearing point. At least one sensor for sensing an axial force is formed at least one of the two bearing points.

21 Claims, 6 Drawing Sheets

(51) Int. Cl.
  *B25J 9/10* (2006.01)
  *B25J 11/00* (2006.01)
  *G01H 9/00* (2006.01)
  *G01H 11/08* (2006.01)
  *G01L 9/14* (2006.01)

(52) U.S. Cl.
  CPC .......... *B25J 11/0055* (2013.01); *B25J 19/02* (2013.01); *B25J 19/027* (2013.01); *B25J 19/028* (2013.01); *G01H 9/00* (2013.01); *G01H 11/08* (2013.01); *G01L 9/14* (2013.01)

(58) Field of Classification Search
  CPC ........ B25J 19/027; B25J 19/028; B25J 9/108; B25J 9/1633; B25J 9/1638; B25J 9/1694; B25J 13/08
  See application file for complete search history.

(56) References Cited

U.S. PATENT DOCUMENTS

| | | | | |
|---|---|---|---|---|
| 6,895,793 | B2* | 5/2005 | Heffron | B21H 7/185 |
| | | | | 72/110 |
| 8,694,150 | B2* | 4/2014 | Meidar | B25J 9/047 |
| | | | | 700/193 |
| 9,597,799 | B2 | 3/2017 | Windprechtinger et al. | |
| 2002/0083751 | A1* | 7/2002 | Heffron | B21H 7/185 |
| | | | | 72/110 |
| 2007/0288124 | A1 | 12/2007 | Nagata et al. | |
| 2012/0227389 | A1* | 9/2012 | Hinderks | F01L 1/146 |
| | | | | 60/317 |
| 2015/0088308 | A1 | 3/2015 | Isobe et al. | |

FOREIGN PATENT DOCUMENTS

| | | |
|---|---|---|
| EP | 1 696 216 A1 | 8/2006 |
| EP | 2 447 013 A1 | 5/2012 |
| GB | 2218963 A | 11/1989 |
| RU | 161185 U1 | 4/2016 |

OTHER PUBLICATIONS

Vo-Gia et al., Development of a 7DOF soft manipulator arm for the compliant humanoid robot COMAN, 2014, IEEE, p. 1106-1111 (Year: 2014).*

Bandara et al., A multi-DoF anthropomorphic transradial prosthetic arm, IEEE, 2014, p. 1039-1044 (Year: 2014).*

Asfour et al., ARMAR-4: A 63 DOF torque controlled humanoid robot, 2013, IEEE, p. 390-396 (Year: 2013).*

International Search Report of PCT/AT2018/060052, dated Jun. 22, 2018.

Letter of Austrian Patent Attorney to European Patent Office dated Dec. 20, 2018 regarding PCT/AT2018/060052 with English translation.

Letter of Austrian Patent Attorney to European Patent Office dated Apr. 5, 2019 regarding PCT/AT2018/060052 with English translation.

* cited by examiner

ARTICULATED-ARM ROBOT AND METHOD FOR MACHINING A WORKPIECE BY MEANS OF THE ARTICULATED-ARM ROBOT

CROSS REFERENCE TO RELATED APPLICATIONS

This application is the National Stage of PCT/AT2018/060052 filed on Feb. 27, 2018, which claims priority under 35 U.S.C. § 119 of Austrian Application No. A50158/2017 filed on Feb. 28, 2017, the disclosures of which are incorporated by reference. The international application under PCT article 21(2) was not published in English.

The invention relates to an articulated-arm robot as well as a method for processing a workpiece by means of the articulated-arm robot.

Articulated-arm robots comprising a working head having a working spindle held in a spindle housing are known from the prior art. A processing tool is clamped in the working spindle. By pressing the processing tool against the workpiece to be processed, a force is exerted on the articulated-arm robot through which the articulated-arm robot is slightly deformed. The deformation of the articulated-arm robot causes inaccuracies in processing the workpiece.

EP 1696216 A1 discloses an articulated-arm robot comprising a base, a working head holder, several lever arms, which are arranged between the base and the working head holder, wherein the lever arms are coupled to one another by means of revolute joints and wherein for each revolute joint at least one actuator is provided, which serves for adjustment of the angle between the two lever arms coupled by means of the respective revolute joint. Moreover, a working head, which is arranged on the working head holder, is provided, wherein the working head comprises a working spindle, which is arranged in a spindle housing and is mounted in the spindle housing at least at a first bearing point and a second bearing point. It is further provided for that a gear is provided between the actuator and the corresponding revolute joint. In the gear, a gear shaft is provided, wherein sensors, which serve for sensing the torques and bending moments in the gear shaft, are provided in the bearing points of the gear shaft.

It was the object of the present invention to overcome the disadvantages of the prior art and to provide an improved articulated-arm robot as well as an improved method for processing a workpiece.

This object is achieved by means of a device and a method according to the claims.

According to the invention, an articulated-arm robot is provided. The articulated-arm robot comprises: a base, a working head holder, several lever arms, which are arranged between the base and the working head holder, wherein the lever arms are coupled to one another by means of revolute joints and wherein for each revolute joint at least one actuator is provided, which serves for adjustment of the angle between the two lever arms coupled by means of the respective revolute joint, a working head, which is arranged on the working head holder, wherein the working head comprises a working spindle which is arranged in a spindle housing and is mounted in the spindle housing at least at a first bearing point and a second bearing point, a computational unit which serves for controlling the actuators. At least one sensor for sensing a radial force is formed at each of the first bearing point and the second bearing point. At least one sensor for sensing an axial force is formed at at least one of the two bearing points.

The advantage of the formation of the articulated-arm robot according to the invention is that by the arrangement of the sensors directly in the bearing points, the axial load, radial load as well as bending moments acting on the processing tool can be sensed. Moreover, sensors arranged on the bearing points have a high accuracy of sensing, as occurring forces can be measured as directly as possible. The mass and thus also the inertia of the parts located between the force application point (tool center point) and the sensors is very low, as these merely are the processing tool itself and the working spindle. As these have a low mass, the inertia to be taken into consideration is low as well and can, where appropriate, still be included in the calculation.

It can further be useful if the two bearing points are formed by a magnetic bearing and the sensors are realized by a measuring device for determining the field strength in the magnetic bearing and for sensing the deflection of the working spindle relative to the spindle housing. The advantage of this is that by means of a magnetic bearing, a high rotational frequency of the processing tool can be realized. Moreover, the forces applied can be determined precisely in the magnetic bearing.

It can further be provided for that the working spindle is adjustable relative to the spindle housing by means of the magnetic bearing. The advantage of this is that by this measure, the working spindle can be displaced relative to the spindle housing for compensating deformations, whereby slight deformations occurring in the articulated-arm robot can be compensated. In this regard, it is particularly advantageous that by means of the magnetic bearing, slight deformations can be compensated with a very short reaction time. Moreover, it is for example also conceivable that by means of the magnetic bearing, the working spindle is caused to vibrate relative to the spindle housing and thus for example high-frequency axial vibrations are carried out. This axial vibration can for example effect an improved chip formation.

In an alternative variant, it can be provided for that the sensors are designed in the form of piezoelectric elements. Such sensors in the form of piezoelectric elements can for example be combined with common rolling bearing or sliding bearings.

In yet another alternative variant, it can be provided for that the two bearing points are formed by a hydrodynamic sliding bearing and the sensors are realized by a measuring device for determining the hydraulic pressure in the bearing points and for sensing the deflection of the working spindle relative to the spindle housing, wherein the working spindle can be adjusted relative to the spindle housing by means of the hydrodynamic sliding bearings. A hydrodynamic sliding bearing provides the possibility of adjusting the working spindle relative to the spindle housing. The hydrodynamic sliding bearing can for example be driven using an oil. Moreover, it is also conceivable that the hydrodynamic sliding bearing is driven using a gas.

According to a further development, it is possible that the spindle housing is held on the working head by means of a linear guide such that it can be displaced axially. The advantage of this is that for example during a drilling process by means of a drill bit clamped in the working spindle, the feed movement of the drill bit does not have to be carried out by means of the robot arms but that the spindle housing can be displaced linearly. Hence, the accuracy of the drill can be increased. Moreover, such feed movements can be sensed directly at the sensors of the bearing points.

It can further be useful if a support sleeve, which is provided for supporting a workpiece to be processed, is formed on the working head and that in the support sleeve, a further sensor is provided for sensing the support force of the support sleeve on the workpiece. The advantage of this is that by the support sleeve, the entire working head can be pressed against the workpiece to be processed with a predefined force, whereby the articulated-arm robot can be put under preload. During subsequent pressing of the processing tool against the workpiece, the reduction of the pressing force measured on the further sensor can be determined and thereby, a direct conclusion can be made regarding the pressing force applied by the processing tool. This can for example serve the purpose of comparison with the forces measured in the sensors.

Moreover, it can be provided for that a vibration sensor, which is provided for sensing vibrations on the workpiece, is provided on the working head. The advantage of this is that by means of the vibration sensor, the vibration transferred to the workpiece by the processing tool can be sensed and in further consequence be evaluated in the computational unit.

Moreover, it can be provided for that the vibration sensor is held in the support sleeve. The advantage of this is that a vibration sensor held in the support sleeve can be brought into direct contact with the workpiece.

According to a particular embodiment, it is possible that the vibration sensor is held on the working head, in particular in the support sleeve, such that it can freely vibrate and can be coupled to the workpiece. The advantage of this is that by this measure, the vibrations of the working head can be decoupled and the vibrations occurring on the workpiece can thus be sensed.

According to an advantageous further development, it can be provided for that the vibration sensor is provided in the form of an acceleration sensor, in particular in the form of a piezoelectric sensor, by means of which its own orientation and also an amplitude and direction of the vibration of the workpiece can be determined while the vibration sensor rests on the workpiece. The advantage of this is that by means of a thus designed acceleration sensor, the vibrations of the workpiece can be sensed and evaluated not only quantitatively but also qualitatively. Moreover, by means of the vibration sensor in the form of an acceleration sensor, the spatial orientation of the vibration sensor can be sensed.

In an alternative variant, it can be provided for that the vibration sensor is provided in the form of a laser Doppler vibrometer. The advantage of this is that by means of a laser Doppler vibrometer, a contactless sensing of the surface vibration of the workpiece is possible.

According to the invention, a method for machining a workpiece by means of an articulated-arm robot according to the invention is provided, wherein a processing tool for machining the workpiece is held and/or clamped in the working spindle. When the processing tool is pressed against the workpiece, the radial force and the axial force in the bearing points are sensed by means of the sensors. Hence, the pressing force of the processing tool against the workpiece can be calculated in the computational unit. By sensing the vibrations in combination with the sensed pressing force of the processing tool against the workpiece, for example conclusions regarding the wear on the cutting edge and/or the condition of the workpiece can be made.

It can further be provided for that on the basis of the calculated pressing force of the processing tool and on the basis of a known force-dependent component deformation of the articulated-arm robot, a necessary compensation of position is calculated and the necessary compensation of position is realized at least in one of the actuators. The advantage of this is that by taking into consideration the force-dependent component deformation of the articulated-arm robot, the accuracy of the articulated-arm robot can be increased.

Moreover, it can be provided for that on the basis of the calculated pressing force of the processing tool and on the basis of a known force-dependent component deformation of the articulated-arm robot, a necessary compensation of position is calculated and the necessary compensation of position is realized at least partially by adjusting the working spindle relative to the spindle housing. The advantage of this is that by adjusting the working spindle relative to the spindle housing, the compensation of position can be carried out with an increased accuracy. Moreover, such a compensation of position can be carried out relatively fast and with a short reaction time. The compensation of position by means of the working spindle can be superimposed with the compensation of position by means of the articulated-arm robot.

An embodiment, according to which it can be provided for that in case of a magnetic bearing, the radial force and the axial force in the bearing points are detected by determination of the field strength in the magnetic bearings and by sensing the deflection of the working spindle, is also advantageous.

According to a further development, it is possible that an adjustment of the working spindle relative to the spindle housing is realized by the field strength in the magnetic bearings being locally adapted.

It can further be useful if during use of a processing tool with a symmetric setup of the cutting edge, in particular during use of a drilling tool, a support angle between the axis of rotation of the processing tool and the workpiece surface which the processing tool rests on is calculated from the sensed radial forces by means of the lever principle. The advantage of this is that the support angle of the processing tool relative to the workpiece to be processed can be calculated merely by determining the radial forces and, if need be, the processing tool can be correspondingly further rotated, such that the axis of rotation of the processing tool forms a right angle to the workpiece surface.

Moreover, it can be provided for that additionally to the calculated pressing force of the processing tool, the support force of the support sleeve on the workpiece sensed by the further sensor is included in the calculation of the necessary compensation of position.

It can further be provided for that the signal of the vibration sensor is evaluated in the computational unit and based on the signal of the vibration sensor and the measured radial force and axial force in the bearing points, the necessary compensation of position is calculated.

The terms radial force and axial force refer to the axial position of the working spindle.

For the purpose of better understanding of the invention, it will be elucidated in more detail by means of the figures below.

These show in a respectively very simplified schematic representation:

FIG. 5 a schematic representation of the force effect onto the bearing situation with a processing tool not positioned orthogonally to the surface of the workpiece;

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
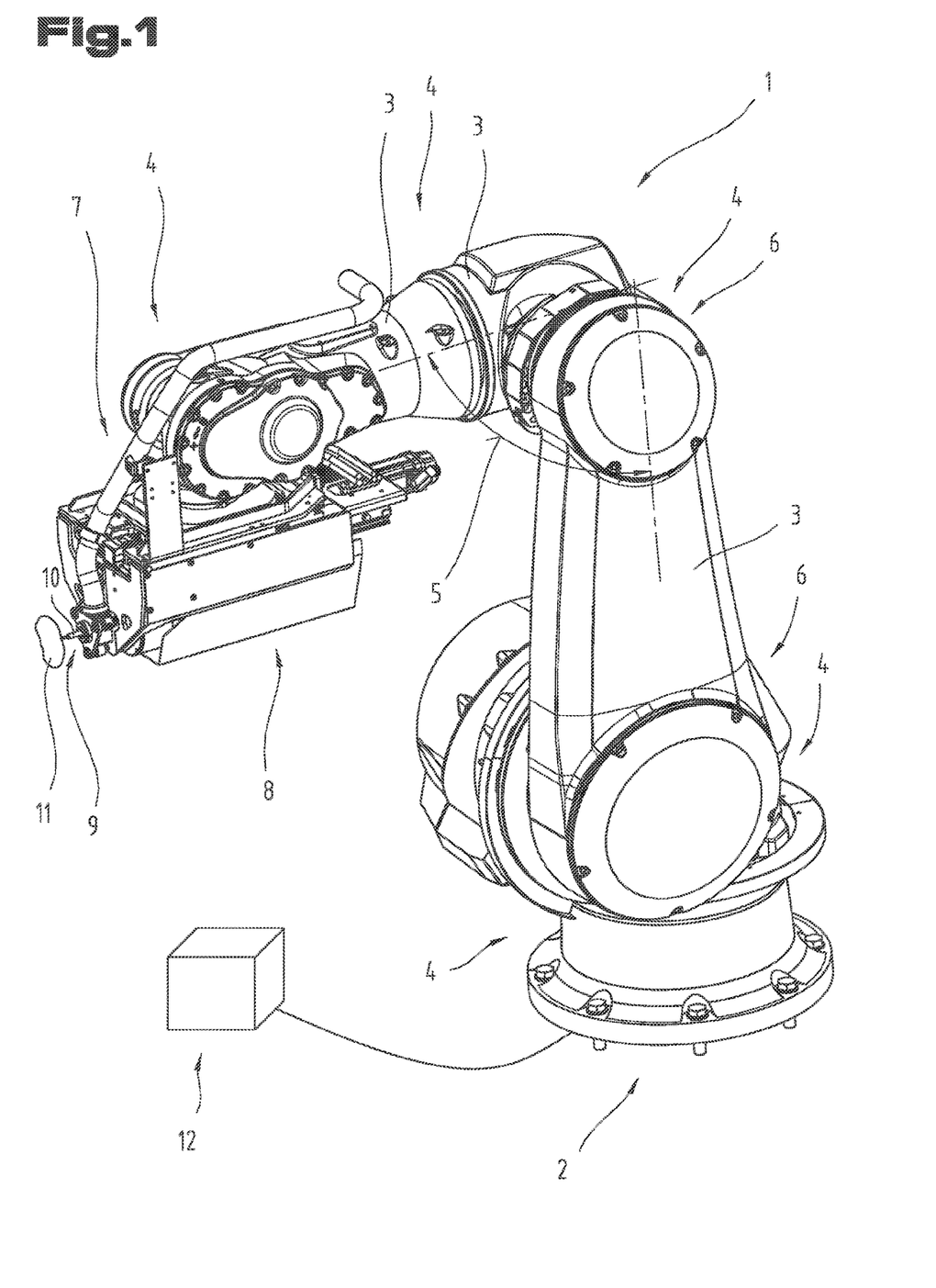
FIG. 1 an exemplary embodiment of an articulated-arm robot in a perspective view.

FIG. 1 shows perspective view of an articulated-arm robot 1. The articulated-arm robot 1 comprises a base 2 which is preferably fixed to the ground of the installation site by means of mounting means. For example, it is also conceivable that the base 2 is arranged on a linear guide such that the entire articulated-arm robot 1 can be displaced in a longitudinal direction.

Several lever arms 3 are coupled to the base 2, the individual lever arms 3 being coupled to one another and/or one of the lever arms 3 being coupled to the base 2 by means of revolute joints 4. The revolute joints 4 can be designed differently. They preferably serve the purpose of adjusting an angle 5 between two lever arms 3 coupled to one another.

In a first embodiment type of the revolute joint 4, the two lever arms 3 are arranged so as to be axially aligned with respect to its longitudinal axis and one of the two lever arms 3 can be rotatably turned about the central longitudinal axis relative to the other lever arm 3 by means of the revolute joint 4.

In a second embodiment of the revolute joint 4, the two lever arms 3 are arranged next to one another and the lever arms 3 can be pivoted relative to one another such that the angle 5 between the two longitudinal axes of the lever arms 3 can be varied.

Moreover, each revolute joint 4 is assigned an actuator 6 by means of which the angle 5 between the two lever arms 3 can be adjusted. The actuator 6 can for example be provided in the form of a servomotor. A working head holder 7, on which a working head 8 is mounted, is provided on the lever arm 3 located the furthest from the base 2.

The working head 8 comprises a working spindle 9 on which a processing tool 10 can be held. In particular, a tool holder for holding different processing tools 10 can be provided on the working spindle 9 and/or such a tool holder can be coupled to the working spindle 9. The processing tool 10 serves the purpose of processing a workpiece 11. In particular, it can be provided for that the processing tool 10 is a tool for machining, such as a drill bit or a milling cutter.

Moreover, a computational unit 12 is provided, in which the corresponding control specifications and/or corrections are calculated based on the deformation of material.

Figure 2:
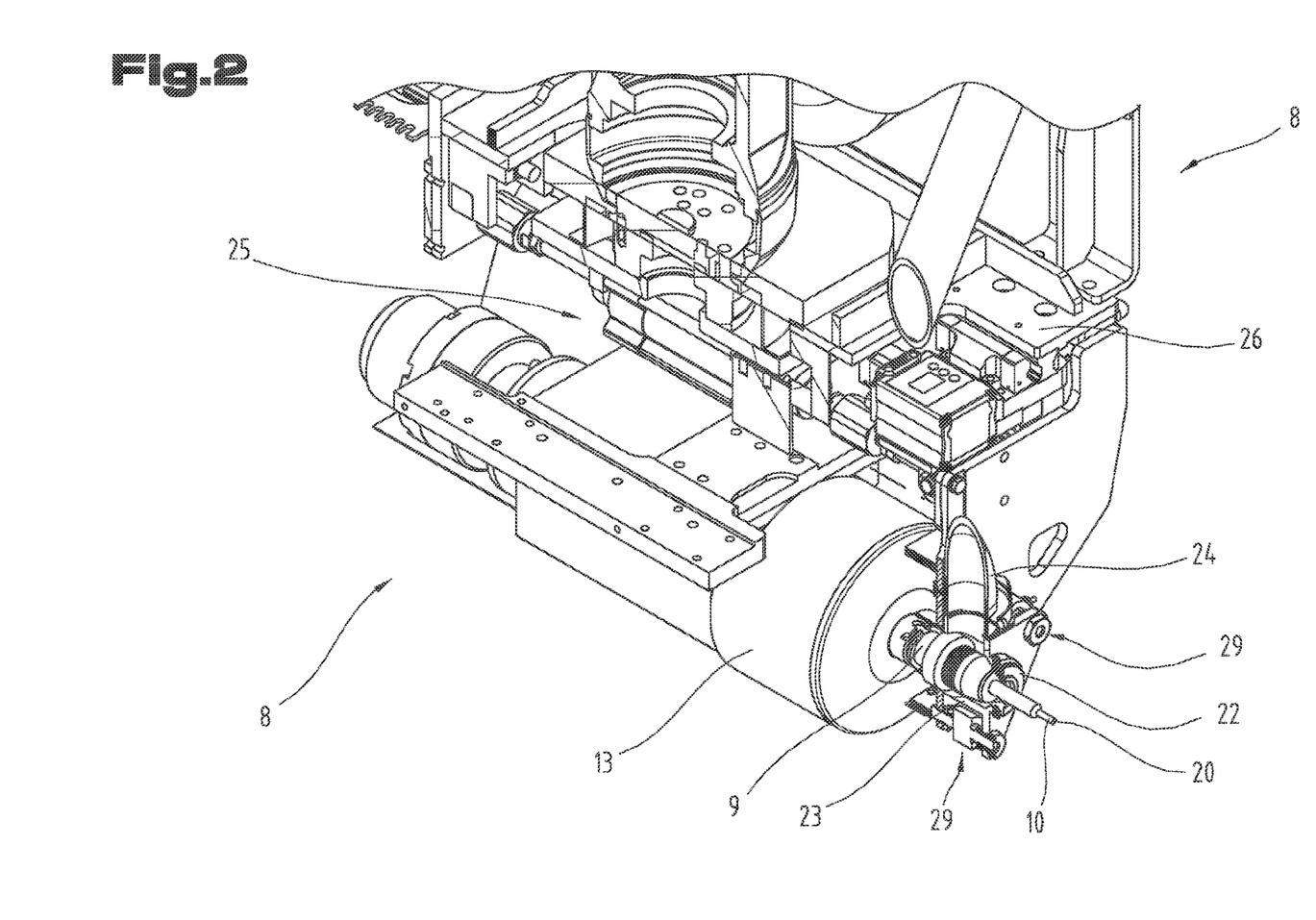
FIG. 2 a detailed representation of a working head.

FIG. 2 shows the working head 8 in a detailed view, wherein the components of the working head 8 are partially shown in a sectional view such that the structure of the working head 8 becomes apparent.

Figure 3:
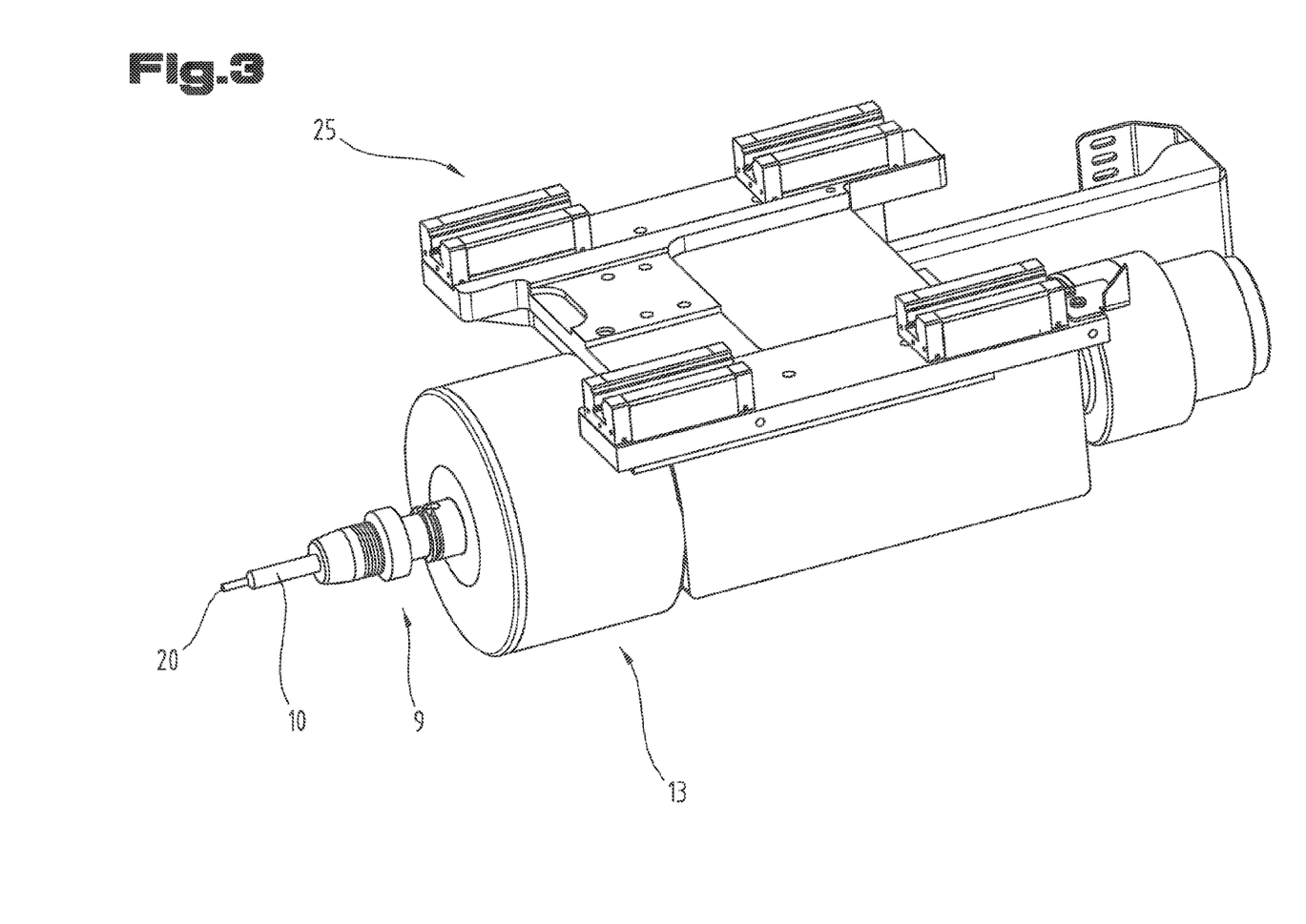
FIG. 3 a perspective view of a spindle housing.

In FIG. 3, a spindle housing 13 for holding the working spindle 9 is shown in detail in a perspective view.

Figure 4:
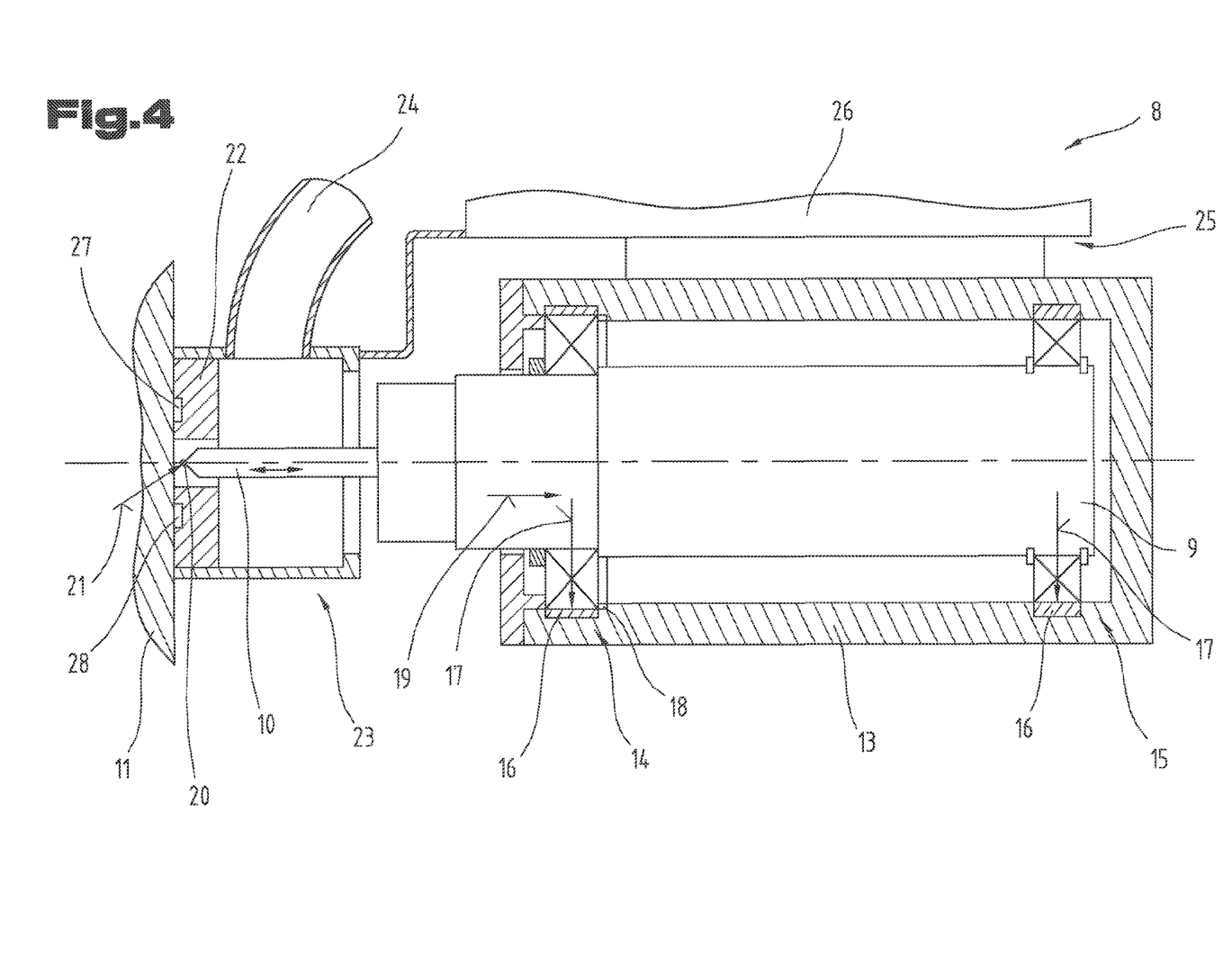
FIG. 4 a schematic sectional view of a spindle housing with a working spindle held therein and representation of the bearing situation.

For further illustration, the spindle housing 13 is shown in sectional view in FIG. 4 so as to describe the bearing situation.

The precise structure of the working head 8 is described by means of the combination of FIGS. 2 to 4. As can be seen particularly well from FIG. 4, the working spindle 9 is mounted in the spindle housing 13 by means of a first bearing point 14 and a second bearing point 15. The first bearing point 14 and/or the second bearing point 15 are schematically adumbrated in FIG. 4 and can be realized by different bearings. It is for example conceivable that the bearing points 14, 15 are provided in the form of rolling bearings, sliding bearings, magnetic bearings, or hydrodynamic fluid bearings. The installation situation as schematically shown in FIG. 4 can for example be realized when using rolling bearings.

As can be seen from FIG. 4, it can be provided for that one of the two bearing points 14, 15 is designed in the form of a fixed bearing serving the purpose of absorbing axial forces. In the present exemplary embodiment, the first bearing point 14 is designed as a fixed bearing. In this regard, it can in particular be provided for that a sensor 16, which serves the purpose of sensing a radial force 17, is formed in the first bearing point 14. Moreover, a sensor 18, which serves the purpose of sensing an axial force 19, can be formed on the first bearing point 14. Moreover, a sensor 16 for sensing the radial force 17 can also be provided on the second bearing point 15. A sensor 18 for sensing an axial force can of course also be provided on the second bearing point 15 and/or also on both bearing points 14, 15.

The sensors 16 for sensing the radial force 17 can for example be provided in the form of piezoelectric elements, which can be arranged distributed across the circumference in the spindle housing 13 or on the working spindle 9. The sensors 16 can serve not only for sensing the amount of the radial force 17 but also for sensing the direction of the radial force 17. The sensor 18 for sensing the axial force 19 can also be provided in the form of a piezoelectric element, which can for example serve as an axial stop for one of the bearing points 14, 15.

By the known geometry of the bearing points 14, 15 and/or by an exactly measured tool center point of the workpiece 11, the amount and direction of a force 21 acting on the tool center point 20 can be exactly determined by means of the sensors 16, 18.

The force 21 is generated by the processing tool 10 for processing the workpiece 11 rests on and/or is pressed against the workpiece 11, in particular on its tool center point 20. When neglecting the friction between the workpiece 11 and the processing tool 10, the force 21 can always be at a right angle to the surface of the workpiece 11 only. Due to the friction between the processing tool 10 and the workpiece 11, the angle of application of the force 21 can deviate from the right angle onto the surface of the workpiece 11.

As by means of the sensors 16, 18 the amount and angle of the force 21 onto the tool center point 20 can be determined, the force acting onto the overall system of the articulated-arm robot 1 can be calculated as well.

By means of finite element calculations and/or by means of empirical determinations, a force-dependent deformation of the articulated-arm robot 1, in particular of the lever arms 3 and/or the revolute joints 4 for each position of the articulated-arm robot 1 and also for each force effect can be determined. Thereby, knowing the deformation of the articulated-arm robot 1, its current position and the force 21 currently applied to the tool center point 20, the deformation-related deviation of the tool center point 20 from its desired position with respect to its actual position can be calculated. This deviation can be compensated by a compensation of position as described above.

It is further also conceivable that by determination of the angle of the force 21 onto the tool center point 20, it is determined whether the processing tool 10 actually rests on the surface of the workpiece 11 at a right angle. In this regard, optionally, a required compensation can also be calculated and carried out in the computational unit 12.

As can be further seen from FIG. 4, it can be provided for that a support sleeve 22, which serves for support on the workpiece 11, is formed on the working head 8. A suction housing 23, which a suction hose 24 is connected to, can be coupled to the support sleeve 22. The suction housing 23 can be stationarily mounted to the working head 8.

It is further also conceivable that the spindle housing 13 along with the working spindle 9 is arranged on the working head 8 by means of a linear guide 25 so as to be displaceable relative to a base 26 of the working head 8. In other words, it can hence be achieved that the spindle housing 13 along with the working spindle 9 can be displaced linearly relative to the base 26 of the working head 8.

Hence, a feed of the processing tool 10 can be achieved merely by means of the linear displacement of the spindle housing 13. Of course, the actual processing process and/or drilling process can also be achieved by mere displacement of the spindle housing 13. As the support sleeve 22 is coupled to the base 26 of the working head 8, the working spindle 9 and thus also the processing tool 10 are displaced towards the support sleeve 22 during such a displacement process.

It can further also be provided for that the base 26 of the working head 8 along with the support sleeve 22 is displaceable relative to the working head holder 7. In this regard, it is for example conceivable that the base 26 of the working head 8 along with the support sleeve 22 is displaceable by means of a pneumatic cylinder, wherein the pneumatic cylinder can press the support sleeve 22 against the workpiece with a predefined force. The spindle housing 13 can be displaceable relative to the support sleeve 22 by means of an electric drive. Thereby, the spindle housing 13 can be advanced and/or fed precisely.

It can further be provided for that a further sensor 27, which serves for sensing the pressing force of the support sleeve 22 against the workpiece 11, is provided in the support sleeve 22. In the computational unit 12, a resulting force can be calculated from the radial force 17 measured in the sensors 16 and the axial force 19 measured in the sensors 18 as well as from the force measured in the further sensor 27.

It is further also conceivable that a vibration sensor 28, which is designed for sensing vibrations in the workpiece 11, is arranged in the support sleeve 22. The vibration sensor 28 can for example be held on the workpiece 11 by a magnetic force and bee held in the support sleeve 22 such that it can freely vibrate. It can hence be achieved that merely the vibrations of the workpiece 11 are sensed by the vibration sensor 28.

A free running mounting of the vibration sensor 28 in the support sleeve 22 can for example be achieved by the vibration sensor 28 being embedded in a gel cushion and thereby being displaceable relative to the support sleeve 22. It is further also conceivable that the vibration sensor 28 is coupled to the support sleeve 22 by means of an elastic membrane or another elastic element. For example, it is also conceivable that the vibration sensor 28 is coupled to the support sleeve 22 by means of a spring-based mounting so as to be free running.

As can well be seen from FIG. 2, it is also conceivable that at least three measuring elements 29, by means of which the distance to the surface of the workpiece 11 can respectively be determined, are arranged in the region of the support sleeve 22 around the working spindle 9 and/or the processing tool 10. Knowing the surface character and/or the surface geometry of the workpiece 11, for example from a CAD model, and measuring the actual distance of the surface to the respective measuring element 29, it can be calculated whether the processing tool 10 is oriented orthogonally to the surface of the workpiece 11.

The measuring element 29 can for example be provided in the form of a measuring pin, which is pressed against the surface of the workpiece 11 having been preloaded by means of a spring. Hence, the distance can be measured by means of tactile scanning. It is further also conceivable that the measuring element 29 is provided in the form of an optical sensor, for example a laser sensor, which serves for sensing the distance.

FIG. 5 shows a schematic representation of the occurring forces 17, 18 on the bearing points 14, 15 and on the processing tool 10 when the processing tool 10 is not directed orthogonally onto the surface of the workpiece 11 and is pressed against the latter. Knowing the geometry of the processing tool 10 and, of course, also the geometry of the spindle housing 13, by determining the amount and direction of the forces 17, 18 on the bearing points 14, 15, the angle between the processing tool 10 and the surface of the workpiece 11 can be calculated and be compensated by pivoting the processing tool 10, such that the processing tool 10 stands orthogonally on the surface of the workpiece 11 for the processing process.

Figure 6:
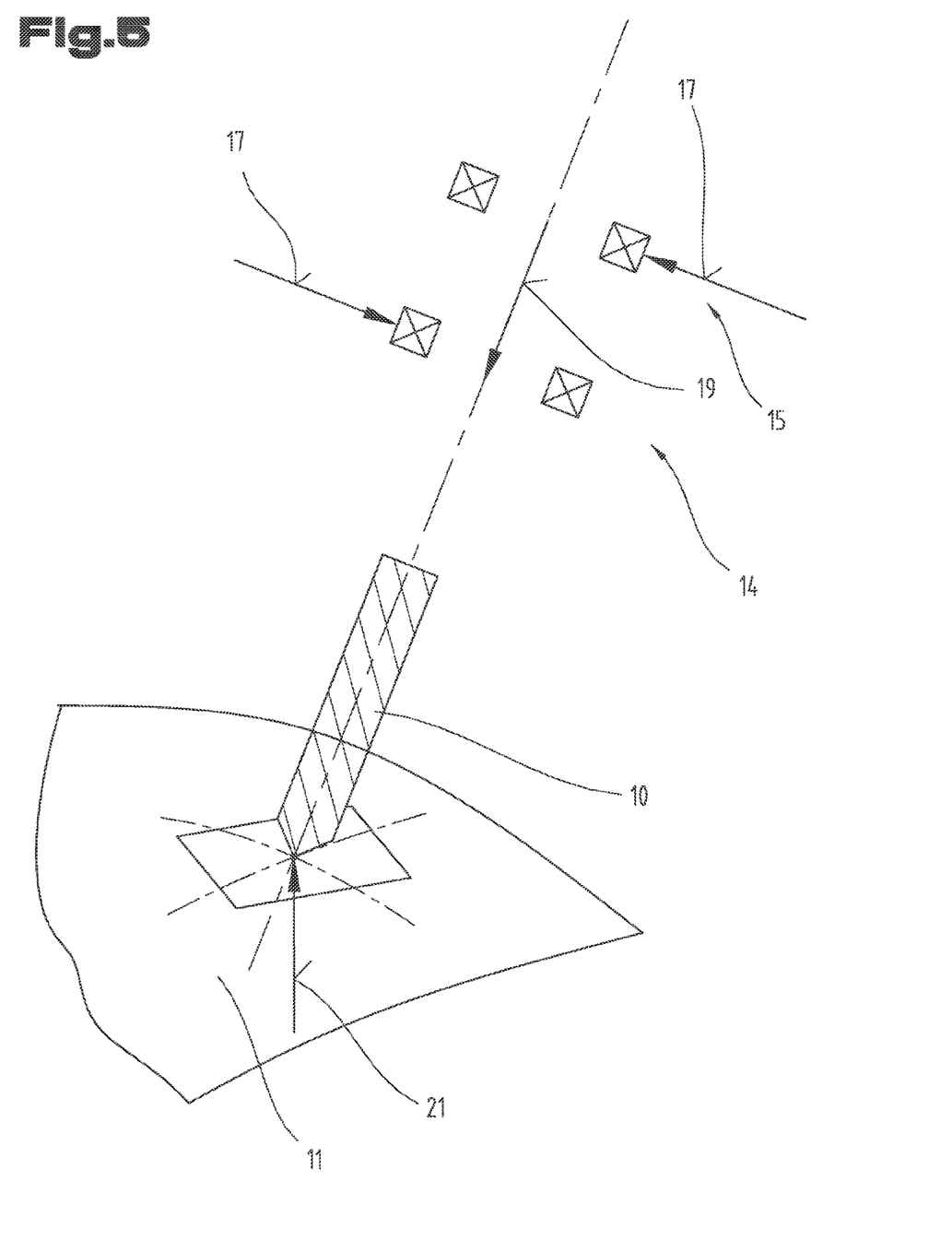
FIG. 6 an exemplary embodiment of the working spindle with magnetic bearing.

FIG. 6 shows a further possible exemplary embodiment of the working spindle 9 and the spindle housing 13 with magnetic bearing 30 in a schematic sectional view.

In the exemplary embodiment according to FIG. 6, it is provided for that the working spindle 9 is mounted and/or optionally driven by means of a magnetic bearing 30 in the spindle housing 13. The magnetic bearing 30 can comprise both a radial bearing 31 and an axial bearing 32. In particular, it can be provided for that the magnetic bearing 30 is formed by windings 33, which cooperate with permanent magnets 34 arranged on the working spindle 9, being provided in the spindle housing 13.

In the windings 33, the field strength can be changed such by means of a corresponding controller that the working spindle 9 is held in its position by the magnetic bearing 30. Moreover, the field strength in the windings 33 of the individual radial bearings 31 can be changed such that the working spindle 9 is not arranged centrally but is displaced towards one side. Hence, a tilting or an off-center arrangement of the working spindle 9 in the spindle housing 13 can be achieved. Moreover, it can be provided for that the field strength in the windings 33 of the axial bearings 32 is adapted, such that the working spindle 9 can be displaced axially. In this regard, it is in particular possible that small force-related deformations of the articulated-arm robot 1 are compensated by axial and/or radial displacement of the working spindle 9. Moreover, it is also conceivable that the working spindle 9 is brought into axial and/or radial vibration by means of the magnetic bearing 30 for example so as to affect chip breakage.

It can further be provided for that a further, non-depicted winding for driving the working spindle 9 is provided in the spindle housing 13. Alternatively, it can be provided for that the working spindle 9 is coupled to an electric motor which serves for applying a torque onto the working spindle 9.

Figure 7:
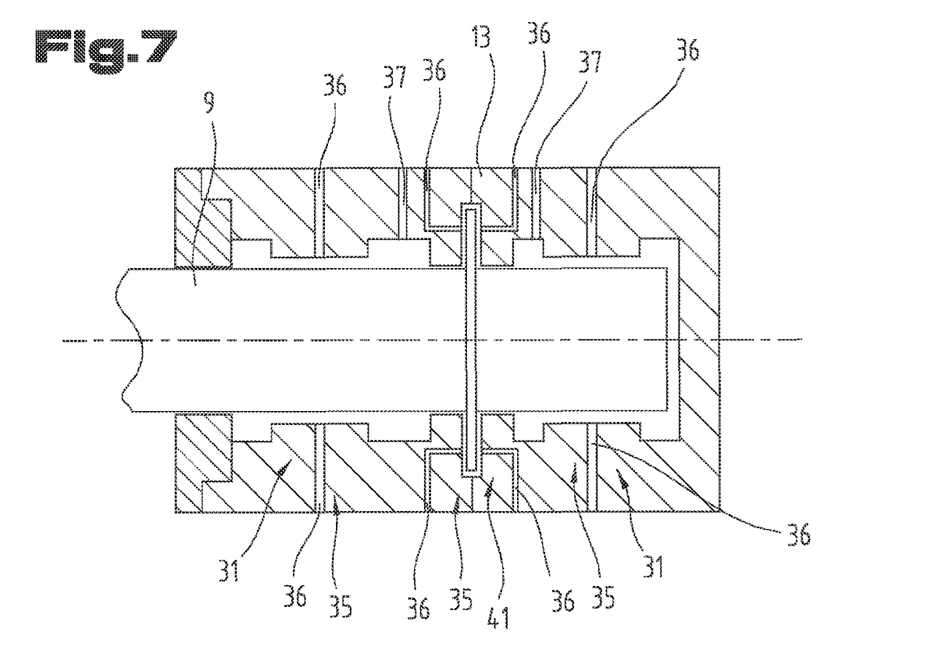
FIG. 7 an exemplary embodiment of the working spindle with hydrodynamic bearing.

FIG. 7 shows a further possible exemplary embodiment of the working spindle 9 and the spindle housing 13 with a hydrodynamic sliding bearing 35 in a schematic sectional view.

Similar to the formation of the magnetic bearing 30 of FIG. 6, in this regard, a radial bearing 31 and an axial bearing 32 can be formed.

Furthermore, several bearing medium inlet openings 36, which serve for pumping in the bearing medium, are provided per radial bearing 31 and per axial bearing 32. In particular for the radial bearings 31, the bearing medium inlet openings 36 can be arranged distributed across the circumference. By targeted pumping in of the bearing medium, for example air or a hydraulic fluid, into specific bearing medium inlet openings 36 distributed across the circumference, the force effect onto the working spindle 9 and thus also the position of the working spindle 9 can be controlled. This also applies to the axial bearings 32.

Of course, bearing medium outlet openings 37, via which the inserted bearing medium can be removed from the inside of the spindle housing 13, must be provided as well. Both the bearing medium inlet openings 36 and the bearing medium outlet openings 37 are depicted in a simplified manner in FIG. 7 and, of course, have to be coupled to corresponding control valves, supply lines and a bearing medium feed pump.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| | |
|---|---|
| 1 | articulated-arm robot |
| 2 | base |
| 3 | lever arms |
| 4 | revolute joint |
| 5 | angle between lever arms |
| 6 | actuator |
| 7 | working head holder |
| 8 | working head |
| 9 | working spindle |
| 10 | processing tool |
| 11 | workpiece |
| 12 | computational unit |
| 13 | spindle housing |
| 14 | first bearing point |
| 15 | second bearing point |
| 16 | sensor radial force |
| 17 | radial force |
| 18 | sensor axial force |
| 19 | axial force |
| 20 | tool center point |
| 21 | force in tool center point |
| 22 | support sleeve |
| 23 | suction housing |
| 24 | suction hose |
| 25 | linear guide |
| 26 | base of working head |
| 27 | further sensor support sleeve |
| 28 | vibration sensor |
| 29 | measuring element |
| 30 | magnetic bearing |
| 31 | radial bearing |
| 32 | axial bearing |
| 33 | winding |
| 34 | permanent magnet |
| 35 | sliding bearing |
| 36 | bearing medium inlet opening |
| 37 | bearing medium outlet opening |

The invention claimed is:

1. An articulated-arm robot comprising:
a base,
a working head holder,
several lever arms, which are arranged between the base and the working head holder, wherein the lever arms are coupled to one another by means of revolute joints and wherein for each revolute joint at least one actuator is provided, which serves for adjustment of the angle between the two lever arms coupled by means of the respective revolute joint,
a working head, which is arranged on the working head holder, wherein the working head comprises a working spindle, which is arranged in a spindle housing and is mounted in the spindle housing at least at a first bearing point and a second bearing point, wherein the working spindle is configured to hold a processing tool for processing a workpiece,
a computational unit which serves for controlling the actuators,
wherein at least one sensor for sensing a radial force is formed at each of the first bearing point of the working spindle and the second bearing point of the working spindle and wherein at least one sensor for sensing an axial force is formed on at least one of the two bearing points,
wherein the computational unit is configured to calculate the pressing force of the processing tool against the workpiece based on the sensed radial force and the sensed axial force.

2. The articulated-arm robot according to claim 1, wherein the two bearing points are formed by a magnetic bearing and the sensors are realized by a measuring device for determining the field strength in the magnetic bearing and for sensing the deflection of the working spindle relative to the spindle housing.

3. The articulated-arm robot according to claim 1, wherein the working spindle is adjustable relative to the spindle housing by means of the magnetic bearing.

4. The articulated-arm robot according to claim 1, wherein the sensors are designed in the form of piezoelectric elements.

5. The articulated-arm robot according to claim 1, wherein the two bearing points are formed by a hydrodynamic sliding bearing and the sensors are realized by a measuring device for determining the hydraulic pressure in the bearing points and for sensing the deflection of the working spindle relative to the spindle housing, wherein the working spindle can be adjusted relative to the spindle housing by means of the hydrodynamic sliding bearings.

6. The articulated-arm robot according to claim 1, wherein the spindle housing is held on the working head by means of a linear guide such that it the spindle housing can be displaced axially.

7. The articulated-arm robot according to claim 1, wherein a support sleeve, which is provided for supporting a workpiece to be processed, is formed on the working head and wherein in the support sleeve, a further sensor is provided for sensing the support force of the support sleeve on the workpiece.

8. The articulated-arm robot according to claim 1, wherein a vibration sensor, which is provided for sensing vibrations on the workpiece, is provided on the working head.

9. The articulated-arm robot according to claim 8, wherein the vibration sensor is held in the support sleeve.

10. The articulated-arm robot according to claim 8, wherein the vibration sensor is held on the working head such that the vibration sensor can freely vibrate and can be coupled to the workpiece.

11. The articulated-arm robot according to claim 8, wherein the vibration sensor is provided in the form of an acceleration sensor, wherein an orientation of the vibration sensor and also an amplitude and direction of the vibration of the workpiece can be determined while the vibration sensor rests on the workpiece.

12. The articulated-arm robot according to claim 8, wherein the vibration sensor is provided in the form of a laser Doppler vibrometer.

13. A method for machining a workpiece by means of the articulated-arm robot according to claim 1,
wherein the processing tool for machining processing the workpiece is held in the working spindle,
wherein when the processing tool is pressed against the workpiece, the radial force and the axial force in the bearing points of the working spindle are sensed by means of the sensors and the pressing force of the processing tool is hence calculated in the computational unit.

14. The method according to claim 13, wherein on the basis of the calculated pressing force of the processing tool and on the basis of a known force-dependent component deformation of the articulated-arm robot and/or deformation of the workpiece, a necessary compensation of position is calculated and the necessary compensation of position is realized at least in one of the actuators.

15. The method according to claim 13, wherein on the basis of the calculated pressing force of the processing tool and on the basis of a known force-dependent component deformation of the articulated-arm robot, a necessary compensation of position is calculated and the necessary compensation of position is realized at least partially by adjusting the working spindle relative to the spindle housing.

16. The method according to claim 13, wherein in case of a magnetic bearing, the radial force and the axial force in the bearing points are detected by determination of the field strength in the magnetic bearings and by sensing the deflection of the working spindle.

17. The method according to claim 16, wherein an adjustment of the working spindle relative to the spindle housing is realized by the field strength in the magnetic bearings being locally adapted.

18. The method according to claim 13, wherein during use of a processing tool with a symmetric setup of the cutting edge, a support angle between the axis of rotation of the processing tool and the workpiece surface which the processing tool rests on is calculated from the sensed radial forces by means of the lever principle.

19. The method according to claim 13, wherein additionally to the calculated pressing force of the processing tool, the support force of the support sleeve on the workpiece sensed by the further sensor is included in the calculation of the necessary compensation of position.

20. The method according to claim 13, wherein the signal of the vibration sensor is evaluated in the computational unit and based on the signal of the vibration sensor and the measured radial force and axial force in the bearing points, the necessary compensation of position is calculated.

21. An articulated-arm robot comprising:
a base,
a working head holder,
several lever arms, which are arranged between the base and the working head holder, wherein the lever arms are coupled to one another by means of revolute joints and wherein for each revolute joint at least one actuator is provided, which serves for adjustment of the angle between the two lever arms coupled by means of the respective revolute joint,
a working head, which is arranged on the working head holder, wherein the working head comprises a working spindle, which is arranged in a spindle housing and is mounted in the spindle housing at least at a first bearing point and a second bearing point, wherein the working spindle is configured to hold a processing tool for processing a workpiece,
a computational unit which serves for controlling the actuators,
wherein at least one sensor for sensing a radial force is formed at each of the first bearing point of the working spindle and the second bearing point of the working spindle and wherein at least one sensor for sensing an axial force is formed on at least one of the two bearing points.

* * * * *

UNITED STATES PATENT AND TRADEMARK OFFICE
CERTIFICATE OF CORRECTION

PATENT NO. : 11,279,029 B2
APPLICATION NO. : 16/486291
DATED : March 22, 2022
INVENTOR(S) : Sehrschoen It is certified that error appears in the above-identified patent and that said Letters Patent is hereby corrected as shown below:

In the Claims

In Column 11, Line 17 (of Claim 6) after "that" delete "it".
In Column 11, Line 46 (of Claim 13) after "for" delete "machining".

Signed and Sealed this
Third Day of May, 2022

Katherine Kelly Vidal
Director of the United States Patent and Trademark Office